United States Patent [19]
Sandström

[11] Patent Number: 5,538,466
[45] Date of Patent: Jul. 23, 1996

[54] MOBILE ABATTOIR

[76] Inventor: Holger Sandström, Klöverträgen 6, S-975 91 Luleå, Sweden

[21] Appl. No.: 507,238
[22] PCT Filed: Feb. 24, 1994
[86] PCT No.: PCT/SE94/00155
  § 371 Date: Aug. 24, 1995
  § 102(e) Date: Aug. 24, 1995
[87] PCT Pub. No.: WO94/18840
  PCT Pub. Date: Sep. 1, 1994

[30] Foreign Application Priority Data

Feb. 26, 1993 [SE] Sweden .................. 9300654

[51] Int. Cl.⁶ .................................................. A22B 3/00
[52] U.S. Cl. ..................... 452/52; 452/125; 452/178
[58] Field of Search ........................ 451/52, 53, 125, 451/178

[56] References Cited

U.S. PATENT DOCUMENTS

| | | | |
|---|---|---|---|
| 3,624,865 | 12/1971 | McDonald | 452/52 |
| 3,657,770 | 4/1972 | Wallace | 452/52 |
| 4,299,010 | 11/1981 | Robertson et al. | 452/128 |
| 4,323,033 | 4/1982 | Vosyka et al. | 119/14.04 |
| 5,195,923 | 3/1993 | Rankin et al. | 452/64 |

FOREIGN PATENT DOCUMENTS

| | | | |
|---|---|---|---|
| 734240 | 10/1932 | France | 452/52 |
| 448144 | 1/1987 | Sweden . | |
| 94/14326 | 7/1994 | WIPO | 452/52 |

*Primary Examiner*—Willis Little
*Attorney, Agent, or Firm*—Nies, Kurz, Bergert & Tamburro

[57] ABSTRACT

A mobile abattoir, particularly for slaughtering and processing sheep and members of the deer family. The abattoir is in the form of a towable, wheel-carried and covered vehicle which includes a machine room (11) that houses equipment for supplying electricity, water and heat distribution, a personnel room (50) and three processing stations, namely a first station (20) which includes lifting and transporting equipment for bringing a slaughtered animal to a first hanging and carcass processing position, a second station (30) which includes equipment for transferring the animal carcass from a hanging position in the first station to a lying position on a longitudinally movable processing bench (31), where the skin of the animal is removed from the carcass, equipment for connecting the carcass to a third station (40) which includes a movable transport part (15) and in which the carcass is finally processed while hanging from the path, whereafter the thus processed carcass is moved to a cooling space (60).

10 Claims, 5 Drawing Sheets

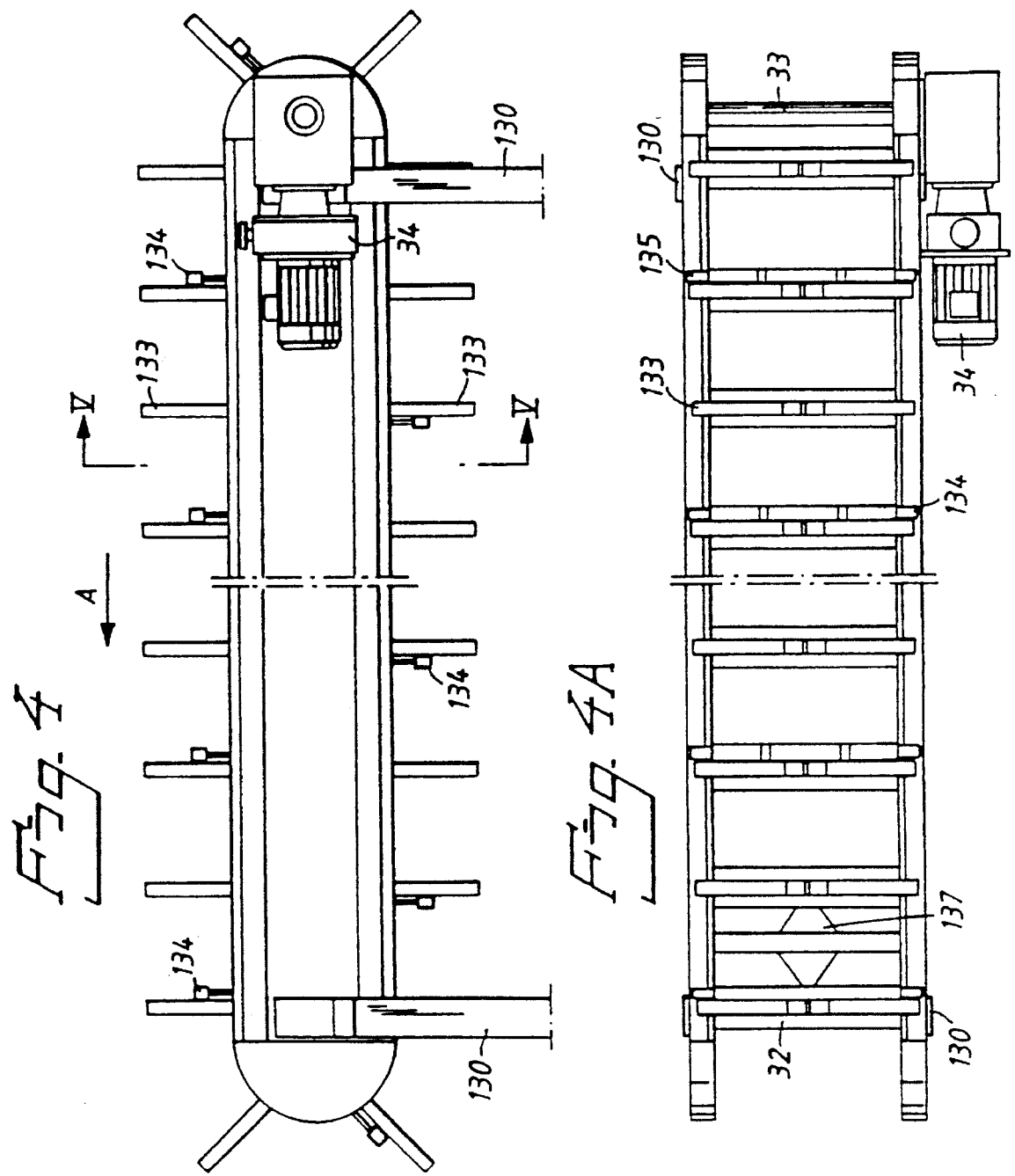

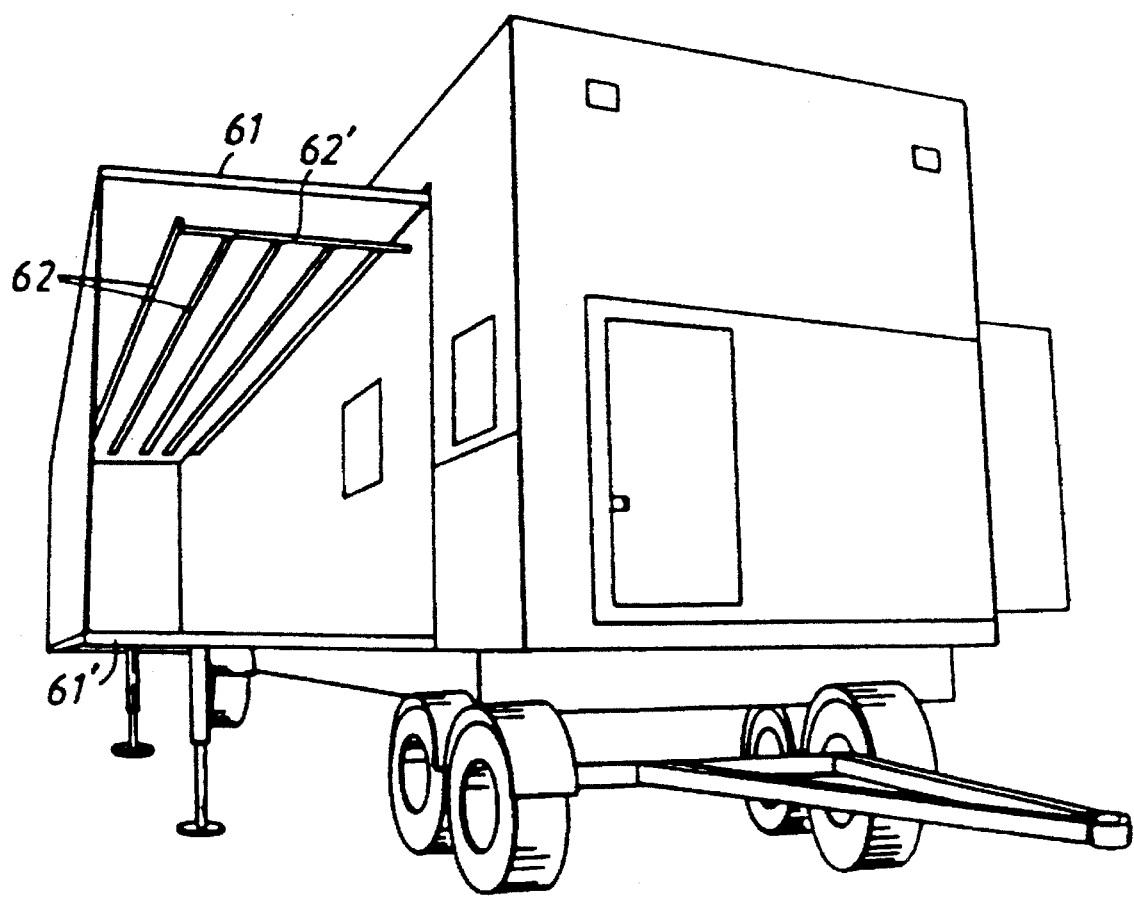

5,538,466

MOBILE ABATTOIR

BACKGROUND OF THE INVENTION

1. Field of the Invention

The present invention relates to a mobile abattoir, or slaughterhouse in the form of a towable, wheel-carried, and covered vehicle including a personnel section and a plurality of processing stations for processing animal carcasses.

2. Description of the Related Art

A mobile abattoir of this kind is known from SE-A-448, 144 and is intended to rationalize the large scale slaughter and dressing of reindeer for instance, and to prepare the animal carcasses for dismemberment.

Taking its starting point from the known technique, the present invention is intended to rationalize the slaughter of animals still further and to this end provides an improved mobile abattoir with which practically all manual lifting work is eliminated while obviating the need to turn the animal carcass when proceeding from one processing station to another.

Another object of the invention is to provide improved means which enable animal carcasses to be skinned in one working operation and the skinned carcass to be transferred from one processing station to another.

Another object of the invention is to provide a towed vehicle which can be extended with the aid of simple means to include necessary cooling space for processed animal carcasses.

Still another object of the invention is to provide a towed vehicle whose length and width lie within the dimensions permitted for country road and highway transportation, but which is so constructed as to enable the length and the width of the vehicle to be significantly enlarged when setting-up the vehicle for work of the nature intended. It is important that this change in vehicle dimensions can be effected quickly and simply.

SUMMARY OF THE INVENTION

The main object of the invention is achieved with an abattoir in the form of a towable, wheel-carried, and covered vehicle the includes a machine room for housing equipment for supplying electricity and water and for heat distribution, a personnel section, and three processing stations. The processing stations include a first station having lifting and transporting means for bringing an animal carcass to a first hanging and carcass processing position, a second station having equipment for transferring the animal carcass from a hanging position in the first station to a lying position on a longitudinally movable processing bench where the skin of the animal is removed from the carcass, and a third station in which the carcass is finally processed while in a hanging position, whereafter the thus processed carcass is moved to a cooling space. A movable transport arrangement permits conveying the carcass from the second station to the third station.

BRIEF DESCRIPTION OF THE DRAWINGS

Other characteristic features of the invention are set forth in the subsidiary claims and will also be evident from the following description of a preferred exemplifying embodiment made with reference to the accompanying drawings, in which

FIGS. 4 and 4A illustrate the driven slaughtering bench forming part of the abattoir in more detail, namely in side view and from above respectively;

FIG. 6 is a perspective view of the cooling section combined with the abattoir.

DESCRIPTION OF THE PREFERRED EMBODIMENTS

Figure 1:
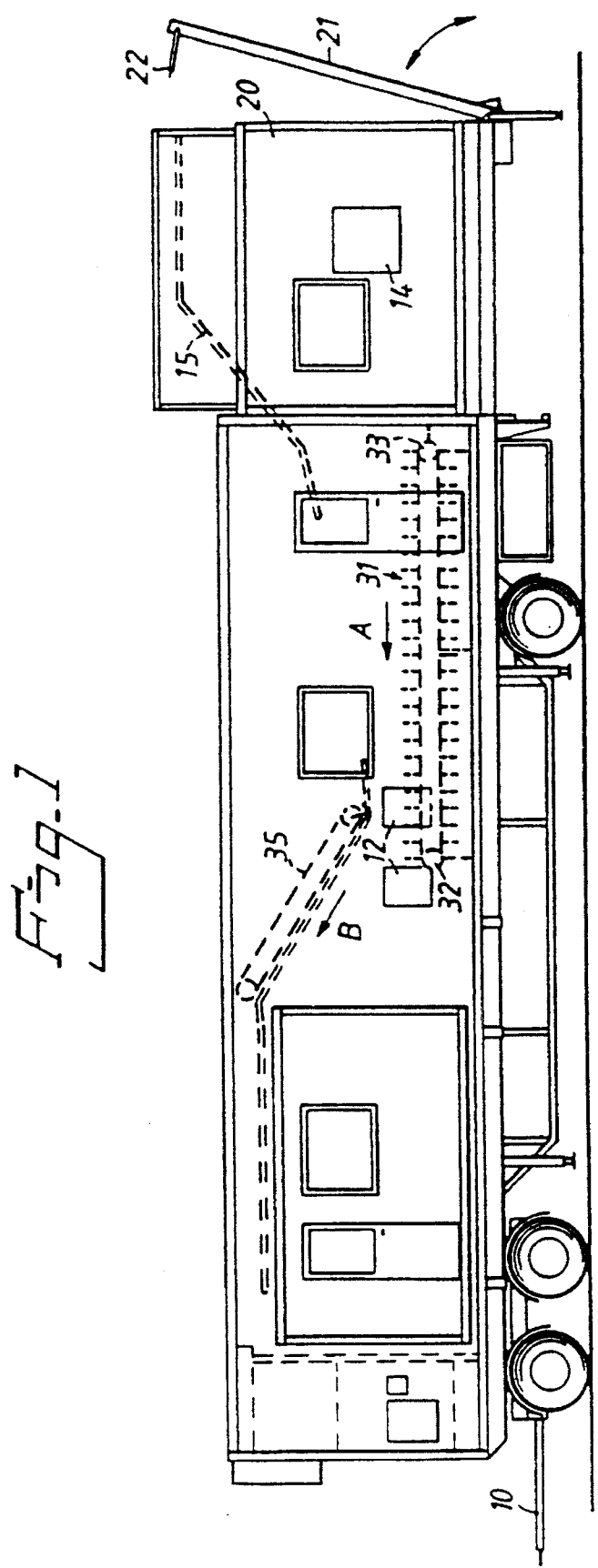
FIG. 1 is a schematic side view of an inventive mobile abattoir.

The mobile towable inventive abattoir is built on a three-axled wheel-supported chassis, and its forward part carries a towing bar 10 which can be connected to a towing vehicle (not shown) in a conventional manner.

The mobile abattoir also includes a machine room to which access can be had from one short side of the vehicle. The machine room (see FIG. 2) 11 may include, among other things, a diesel driven electric power plant, a diesel-driven hot-air plant, a diesel-driven high pressure washing plant, a hydraulic pump, a water pump, an electric fuse box, one or more batteries, for instance 12-volt batteries, a water heater, a diesel tank, and a water tank. All of this equipment, and other equipment that may be installed in the machine room for running the abattoir are generally available and are not shown or described here in detail. Although not shown, the system also includes, of course, pipes and lines for distributing electricity and water within the mobile abattoir.

The mobile abattoir in accordance with the present invention has a heated floor which includes a centrally sunken and covered waste conduit 13 (see FIG. 2) having an outlet 12 which exits through one wall of the abattoir. The floor is covered with aluminium footboards. The abattoir walls have a sandwich construction and are appropriately insulated. Included in the walls are a number of discard flaps or hatches 14 through which waste can be discharged and which are all placed on the same side of the abattoir, i.e. along one long side thereof. Although not shown, suitable containers may be placed beneath respective hatches 14.

When in tow, the mobile abattoir has a length which complies with restrictions concerning transportation on highways/motor ways, and can be extended both in length and in width to a working mode, as will be explained below.

When in its working mode, the inventive mobile abattoir includes a first processing station 20, a second processing station 30 and a third processing station 40. The abattoir also includes a room 50 for personnel and a cooling station 60 for finally processed animal carcasses.

The different processing stations will now be described in detail.

The first processing station 20, also referred to as the blood draining station, is the station in which an animal to be processed is first received. The animal is anesthetized outside the abattoir and a chain is then connected securely to one rear leg of the animal and hooked securely to a hinged lifting arm 21, (see FIG. 1) wherewith the hook means 22 is raised and swung inwardly and docked against a carcass hanging path 15 in the station 20. Subsequent to being transferred from the lifting arm 21 so as to hang head downwards from the first horizontal section of the path 15, blood is drained from the anesthetized animal and runs down into a gully 24 (see FIG. 2), while the head is severed from the remainder of the body and is discharged through the hatch 14 and down into the collecting container (not shown). The last section of the carcass hanging path 15 slopes downwards and enters the second processing station 30. The second processing station includes an elongated carcass processing bench 31 which has a special construction and which will be described below in detail with reference to FIGS. 4, 4A and 5. In principle, the processing bench is comprised of continuous chains which pass around mutually opposite rollers 32, 33, and V-shaped supports which extend transversely between the chains. The processing bench is operated by an electric motor 34 which includes an adjustable variator.

The carcass arriving from the first processing station 20 along the sloping section of the hanging path 15 is removed from the free end of said path and placed on its back on the bench-carried supports, with the rear end of the carcass facing in the transport direction A. The front legs of the carcass are severed at the knee joints, while the two rear legs are also severed at the knee joints, although not completely so that they still remain appended to the skin. Thus, a lower part of the rear legs of the carcass will be connected with the carcass skin. As this takes place, the processing bench is advanced slowly in the direction of the arrow A. As clearly shown in FIG. 5, the lower rear leg parts attached to the skin of the carcass are locked firmly in the bench and thus accompany the bench in its slow forward movement, at the same time as the free upper ends of the severed rear legs are secured to the bottom end of an electrically driven and obliquely upwardly moving elevator 35. The elevator 35 will then draw the carcass obliquely upwards at the same time as the parts of the lower rear legs connected to the driven bench 31 will pass over the turning point (the front roller 32) so as to move in a direction which is roughly opposite to the direction of carcass movement, and therewith draw the skin from the carcass. Subsequent to having stripped the skin completely from the carcass, the skin falls down onto the underlying floor and through a hatch 138 therein, whereafter the skin is removed for treatment, for instance to be cured and tanned.

Figure 5:
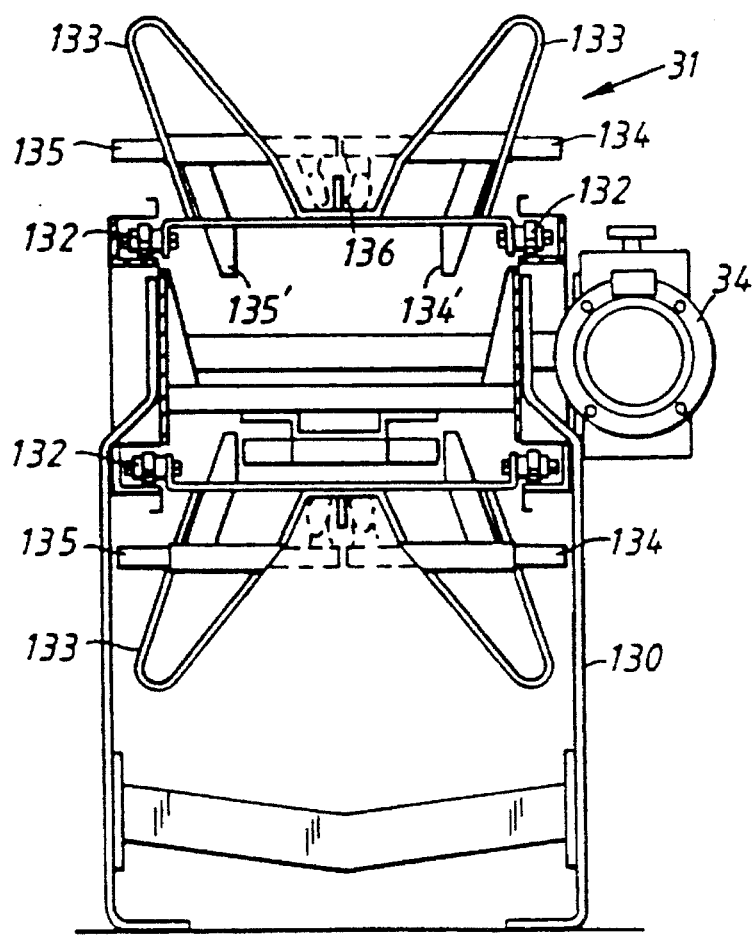
FIG. 5 illustrates the means coacting with the bench in FIGS. 4 and 4A for securing the hooves of the animal carcass, so as to strip-off the skin of the animal carcass with the aid of the movable processing bench and the elevator coupling.

The processing bench 31 is shown in more detail in FIGS. 4, 4A and 5.

As will be seen from these Figures, the bench 31 includes a frame structure 130 which carries an endless swivel-joint chain 132 which is driven by the electric motor 34. The chain 132 coacts functionally with opposing U-shaped carcass support devices 133, and two such opposing devices form an upwardly extending V-shaped support. The animal carcass to be processed is placed between the U-shaped devices longitudinally on its back. A number of such V-shaped supports are disposed in mutually spaced relationship along the chain 132. Each third V-shaped support 133 is provided, for instance, with a locking or latching means for securing the rear hooves of the carcass. One such locking means is illustrated in FIG. 5 and is shown placed on one side of a V-shaped support 133 and includes horizontally movable, opposing latch bolts 134, 135 which are positioned at a distance above the lowest point of the V-shaped supports 133, this lowest point presenting a short, vertical and central partition wall 136. The locking position of the latch bolts 134, 135 is indicated in chain lines in FIG. 5, wherein the latch bolts are intended to retain the partially severed rear legs of the carcass, as indicated in dotted lines in FIG. 5.

Figure 2:
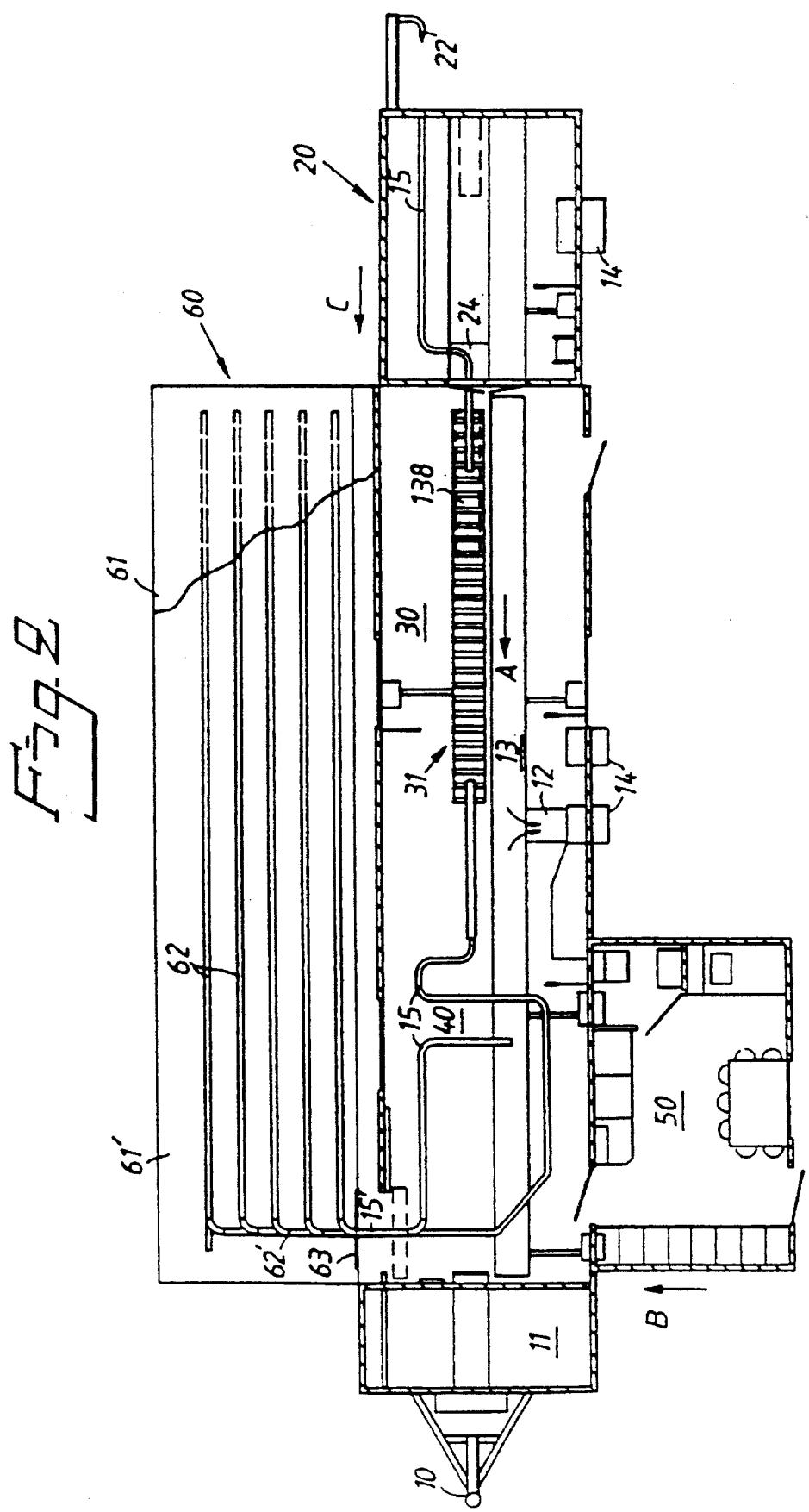
FIG. 2 illustrates the mobile abattoir of FIG. 1 schematically from above.
Figure 3:
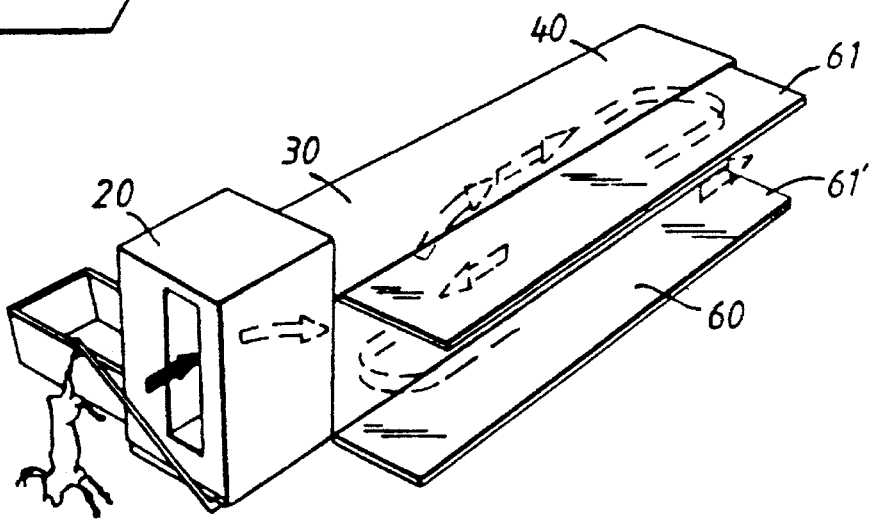
FIG. 3 is a schematic perspective view of the improved abattoir in its working mode.

It was said earlier with reference to FIGS. 1 and 2 that the free ends of the rear legs of the carcass, which lies on its back on the processing bench, are coupled to the elevator 35, which is driven in the direction of arrow B (FIG. 1). As will be understood, when those parts of the rear legs of the carcass that are still attached to the carcass skin are held firmly by means of the latch bolts 134, 135 and the free ends of the rear legs are connected to the elevator 35 driven in the direction of the arrow B, two generally opposite forces will be generated, namely the force exerted by the endless chain 132 upon return movement of said chain (at the left end of the bench in FIG. 4 or 4A), and the generally oppositely acting force exerted by elevator 35. As a result, the skin will be drawn from the carcass and will accompany movement of the chain 132 beneath the bench, the upper side of which is kept free for effecting the same process on the next following carcass.

As will be seen from FIG. 4A, a conical plate 137 is mounted beneath the bench. This plate functions to bring the latch bolts 134, 135 automatically to a release position, i.e. a non-latching position, so as to enable the skin to fall to the floor, for instance through a hatch provided in the floor beneath the bench and opened through the medium of limit switches not shown. This hatch is indicated in FIG. 2 and is referenced 138.

When the skin is stripped from the animal carcass in the aforedescribed manner, no hair from the skin will come into contact with the skinned carcass and neither will hair fall onto the processing bench, but is deposited on the floor surface beneath the bench. This is extremely advantageous from the aspect of hygiene.

The aforementioned automatic release of the push bolt function is achieved as a result of coaction between the conical plate 137 (FIG. 4A) and oblique surfaces 134' and 135' on the respective bolts 134, 135.

The skinned carcass arrives from the elevator 35 to the third processing station 40, which also includes a hanging path 15, and the carcass will therefore hang with the rear legs attached to the hanging path 15 by means of a conventional butcher's hook or like device. The intestines or guts of the animal are removed in station 40, together with viscera, etc., i.e. lungs, heart, kidneys and liver, which are hung up separately for veterinary inspection. It will be evident from the aforegoing that those parts of the carcass which are removed in the various dressing or processing stations 20, 30 and 40 and which are not intended for further use are discarded through the waste hatches 14. An animal carcass that has been processed in accordance with the aforegoing and accepted for human consumption is passed to a cooling station 60 still hanging by its rear legs, as will now be described.

The cooling station 60 (FIGS. 2 and 6) extends along essentially the whole of one long side of the mobile abattoir. In its simplest form, the cooling station is comprised of a hydraulically operable roof section 61 and a hydraulically operable floor section 61' (FIG. 6). In the inoperative mode of the abattoir, these two sections form what can be referred to as an outer long side wall of the abattoir. When the roof section 61 is lifted by means of hydraulic piston-cylinder devices (not shown), the roof section will lie in or generally in the same plane as the remainder of the abattoir roof. The floor section 61' is extended hydraulically outwards and downwards and the plane of said floor section lies in the same plane as the remaining floor surfaces of the abattoir. As will be seen from FIG. 2, the roof section of the cooling space 60 is equipped with a number of mutually parallel hanging paths 62, which extend in the longitudinal direction of the abattoir and each of which has an end which curves to connect with a transverse hanging path section 62' which, in turn, can be connected to the hanging path 15' arriving from the processing station 50, by means of a telescopic connection. A sliding door 63 enables the hanging path 15 in the processing station 40 to form a continuous unit with the hanging path 62 in the cooling station 60, thereby enabling dressed and processed animal carcasses to be moved easily from the processing station 40 to the cooling station 60.

Up to 800 animal carcasses can be handled in the above manner in each working shift with a personnel complement of 6–8 members.

The inventive abattoir also includes a well-organized personnel room. The personnel section 50 of the abattoir is comprised of a telescopically extendable module. The personnel section can thus be withdrawn hydraulically into the main body of the abattoir in the direction of the arrow B (see FIG. 2) and includes all the facilities necessary for personnel comfort. In the transporting mode of the abattoir, the longitudinally extending outer wall of the section 50 also forms the outer wall of the abattoir.

The first processing or dressing station 20 can also be withdrawn telescopically into the main body of the abattoir in the direction of the arrow C, and can also be raised and lowered.

The inventive mobile abattoir thus provides large handling spaces, which in turn contributes towards a high handling rate. The provision of a cooling space 60 enables a large number of animal carcasses to be stored in a satisfactory way prior to being transferred to separate refrigerated vehicles. If so required, for instance in unfavorable weather conditions, the cooling station 60 can be complemented with extendable plastic sheets to form walls which will protect the hanging carcasses.

As will be understood, the mobile abattoir also includes washbasins for washing knives, etc., and also knife-sterilizing means. The abattoir will also be equipped with water-carrying hoses when considered necessary, including high pressure hoses. Downwardly swingable plastic doors and/or hot-air curtains may be provided between the first processing station 20 and the second processing station 30, for instance. The abattoir includes proper ventilation of the processing stations 30 and 40, in particular, which is achieved in a known manner not illustrated in detail here.

I claim:

1. A mobile abattoir for processing slaughtered animals, said abattoir comprising: a towable, wheel-carried and covered vehicle which includes a machine room for supplying electricity and water and for heat distribution, a personnel room, and three processing stations, including a first station having lifting and transporting means for bringing an animal carcass to a first hanging and carcass processing position, a second station having means for transferring the animal carcass from a hanging position in the first station to a lying position on a longitudinally movable processing bench at which the skin of the animal is removed from the carcass, means for conveying the carcass to a third station which includes a movable, carcass transport means and in which the carcass is finally processed while the carcass is in a hanging position, and a cooling space adjoining the third station, wherein in the second station the carcass is placed on the movable processing bench with a front end of the carcass facing towards the first station, wherein rear legs of the carcass are partially severed beneath the knee joint to provide a lower rear leg part and an upper rear leg part so that the lower part of the rear legs will remain attached to the carcass skin, wherein the skin-attached lower part of the rear legs is detachably connected to the movable processing bench while the free, severed upper parts of the rear legs of the carcass are connected to a lifting device extending between the second station and the third station and which slopes from the third station towards the processing bench in the second station, wherein the direction of movement of the lower rear leg parts carried by the processing bench and the direction of movement of the upper rear leg parts connected to the lifting device are in different directions relative to one another, and wherein the carcass skin is removed from the carcass as the carcass is transferred from the processing bench to the lifting device that conveys the carcass to the third station.

2. An abattoir according to claim 1, wherein the processing bench travels in an endless, oval path, and the removed carcass skin is released from the processing bench at an underside of the processing bench and is deposited onto the ground through an openable hatch in the bottom of the vehicle.

3. An abattoir according to claim 1, wherein the processing bench includes a frame structure which carries an endless chain which is driven by an electric motor, wherein the chain supports a plurality of mutually spaced V-shaped support devices for supporting an animal carcass, and wherein a plurality of said V-shaped support devices include opposing push latch bolts for retaining lower rear leg parts of an animal carcass on the support device.

4. An abattoir according to claim 3, wherein a leg-part-receiving space is defined between two mutually opposing push bolts and an associated support device when the push bolts are in an extended, retaining position, wherein the space includes an upper part defined by an undersurface of each of the push bolts and a lower part defined by a member that extends between V-defining parts of a support device.

5. An abattoir according to claim 3 wherein each of two opposing push bolts includes an obliquely extending part and the processing bench includes a plate member positioned to contact the obliquely extending parts at a predetermined position of the support devices, relative to the processing bench, for returning the push bolts to a retracted position.

6. An abattoir according to claim 5, wherein the obliquely extending parts include an edge surface for sliding contact with corresponding oblique surfaces on the plate member.

7. An abattoir according to claim 1, wherein one side of the towable covered vehicle includes a first extendable part for defining a roof of a cooling space, and a second extendable part for defining a floor in said cooling space, and wherein a closable opening is provided in the one side of the vehicle to permit communication between the third station and the cooling space.

8. An abattoir according to claim 7, wherein the cooling space includes rails which are so disposed that a free end of at least one rail is adapted to connect with a free end of a corresponding rail in the third station for transferring hanging carcasses from the third station to the cooling space.

9. An abattoir according to claim 1, wherein the first station is mounted on the vehicle for telescopic movement relative to a side of the vehicle.

10. An abattoir according to claim 1, wherein the personnel room is mounted on the vehicle for telescopic movement relative to a side of the vehicle.

\* \* \* \* \*